United States Patent [19]

Sangha

[11] Patent Number: 5,765,203

[45] Date of Patent: Jun. 9, 1998

[54] STORAGE AND ADDRESSING METHOD FOR A BUFFER MEMORY CONTROL SYSTEM FOR ACCESSING USER AND ERROR IMFORMATION

[75] Inventor: Harmel Singh Sangha, Scotts Valley, Calif.

[73] Assignee: Seagate Technology, Inc., Scotts Valley, Calif.

[21] Appl. No.: 574,669

[22] Filed: Dec. 19, 1995

[51] Int. Cl.$^6$ ...................................................... G06F 12/10
[52] U.S. Cl. ............................................. 711/202; 711/167
[58] Field of Search ................................. 395/445, 412, 395/421.08, 494

[56] References Cited

U.S. PATENT DOCUMENTS

| | | | |
|---|---|---|---|
| 4,918,645 | 4/1990 | Lagoy, Jr. ................................. | 395/478 |
| 5,034,917 | 7/1991 | Bland et al. ............................. | 395/494 |
| 5,127,014 | 6/1992 | Raynham ................................. | 371/37.3 |
| 5,280,601 | 1/1994 | Desai et al. ............................. | 395/405 |
| 5,303,364 | 4/1994 | Mayer et al. ............................ | 395/467 |

Primary Examiner—Tod R. Swann
Assistant Examiner—Chrisopher S. Chow
Attorney, Agent, or Firm—Edward P. Heller, III; Raghunath S. Minisandram

[57] ABSTRACT

A method of storing and retrieving P user information data and Q error information data for the P user information data in a buffer memory unit having multiple DRAMs. P user information data and Q error information data together define a paragraph. Each user information data and error information data have a plurality of information units. Each DRAM has a plurality of rows and columns, with a maximum column address of M and each row capable of storing N such paragraphs. The virtual memory address for each user information data is translated by dividing the virtual memory address by N, then assigning quotient of the division as the row address and assigning remainder of the division as the starting base column address for the user information data. To store or retrieve successive user information data within a paragraph, the base column address is incremented from (starting base column address+0) to (starting base column address+P). The method of selecting a column address for the error information data when the number of error information data per paragraph is one, includes the steps of subtracting starting base column address of corresponding user information data from M the maximum column address and assigning result as the column address for error information data.

7 Claims, 7 Drawing Sheets

| VIRTUAL MEMORY ADDRESS | PARAGRAPH NUMBER | ROW ADDRESS | STARTING BASE COLUMN ADDRESS FOR USER INFO. DATA | COLUMN ADDRESS FOR ERROR INFORMATION DATA |
|---|---|---|---|---|
| 00 | 00 | 00 | 00 | 15 |
| 01 | 01 | 00 | 01 | 14 |
| 02 | 02 | 00 | 02 | 13 |
| 03 | 03 | 01 | 00 | 15 |
| 04 | 04 | 01 | 01 | 14 |
| 05 | 05 | 01 | 02 | 13 |
| 06 | 06 | 02 | 00 | 15 |
| 07 | 07 | 02 | 01 | 14 |
| 08 | 08 | 02 | 02 | 13 |
| 09 | 09 | 03 | 00 | 15 |
| 10 | 10 | 03 | 01 | 14 |
| 11 | 11 | 03 | 02 | 13 |
| 12 | 12 | 04 | 00 | 15 |
| 13 | 13 | 04 | 01 | 14 |
| 14 | 14 | 04 | 02 | 13 |
| 15 | 15 | 05 | 00 | 15 |
| 16 | 16 | 05 | 01 | 14 |
| 17 | 17 | 05 | 02 | 13 |
| 18 | 18 | 06 | 00 | 15 |
| 19 | 19 | 06 | 01 | 14 |
| 20 | 20 | 06 | 02 | 13 |

STORAGE AND ADDRESSING METHOD FOR A BUFFER MEMORY CONTROL SYSTEM FOR ACCESSING USER AND ERROR IMFORMATION

BACKGROUND OF THE INVENTION

This invention relates to memory systems and, more particularly, to methods for controlling buffer memory systems for magnetic disc memory systems.

Temporary storage devices such as dynamic random access memory devices, DRAMS, are often used in connection with magnetic storage media as buffer memories for temporarily storing character information. Each character is represented, for example, by an 8-bit information word and one parity bit. Typically, information is read into a temporary storage memory device one character at a time, using 9 parallel data bit lines. DRAMS are typically available as 1 bit, 2 bit, 8 bit, or 16 bit wide devices so that storage of the extra parity bit associated with each character word is cumbersome, resulting in the parity bit not being stored or being stored in separate memory device. In the alternative, DRAMS with provision for parity bit tend to be too expensive.

In order to efficiently use low cost standard DRAM memory to store data and parity in a variety of DRAM memory modes, a method has been disclosed in U.S. Pat. No. 5,280,601 issued to Desai et al. This patent teaches the method of storing data in 16 byte blocks, by selecting a row address and successively incrementing the column address to store all 16 byte blocks of data. It further teaches a method of providing an 8 bit parity word for said 16 byte blocks, selecting a parity-word row address and selecting a parity-word base column address for a first 4-bit group of said 8-bit parity word; and incrementing said parity-word column address to provide a second column address for a second 4-bit group of said 8-bit parity word. The error detection code word is then transferred through the 4-bit data bus to the various predetermined address locations for said 8-bit parity word in said 4+n memory unit, by presenting a parity-word row address and corresponding parity-word column address.

Figure 1:
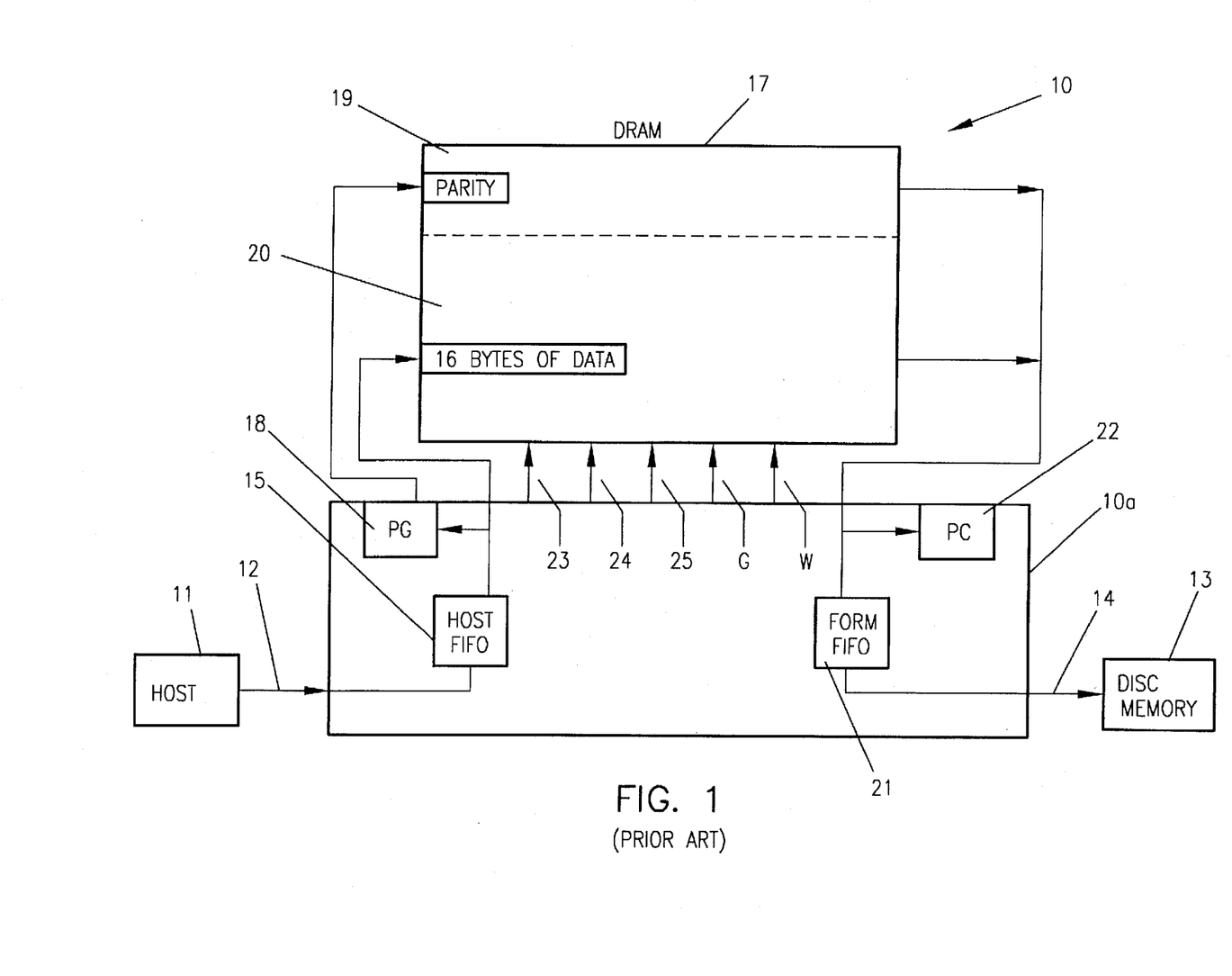
FIG. 1 shows the layout of data bits and parity according to the teachings of prior art implementation.
Figure 2:
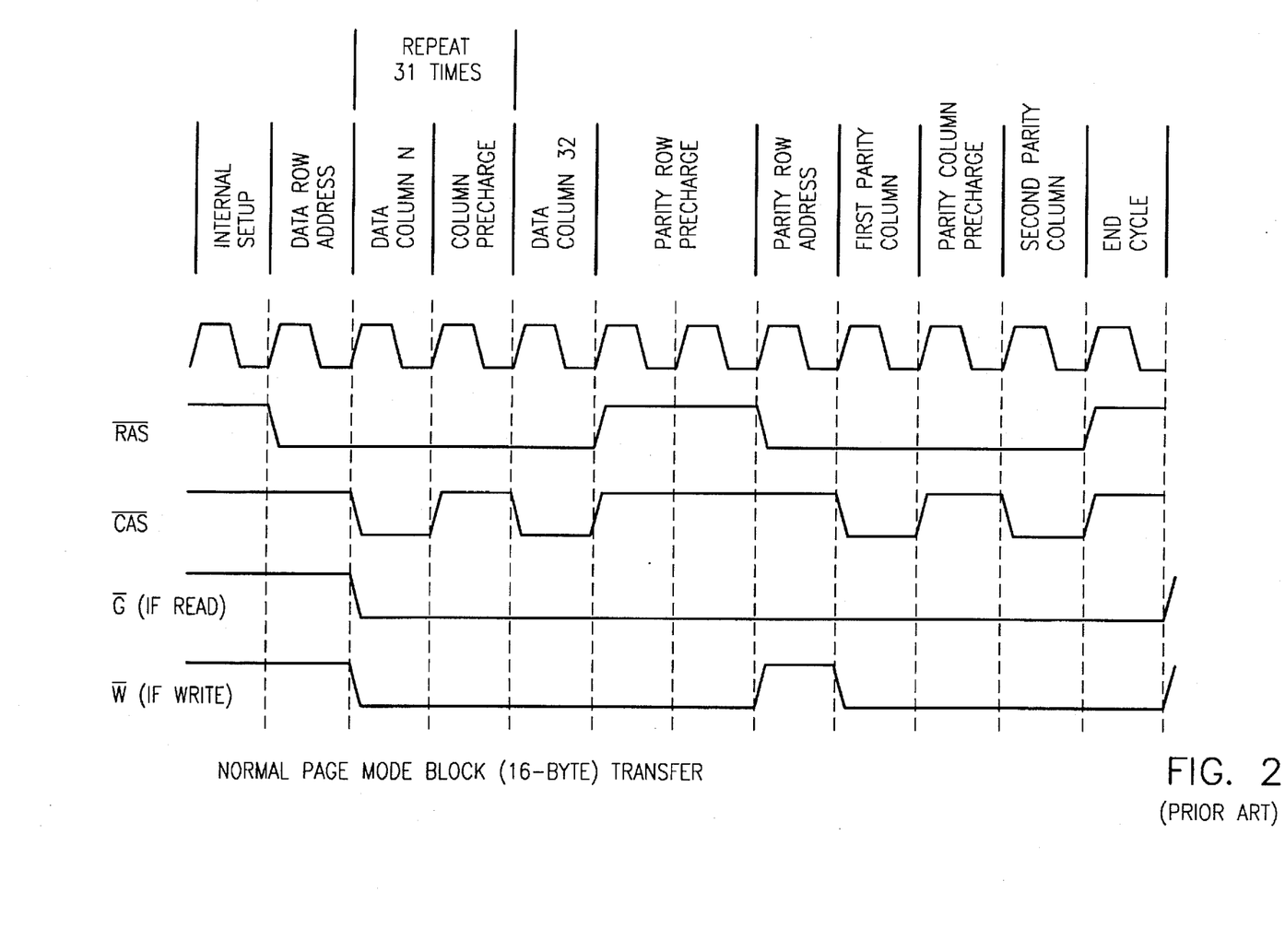
FIG. 2 shows timing cycles associated with the prior art implementation as shown in FIG. 1 for a normal page mode DRAM.
Figure 3:
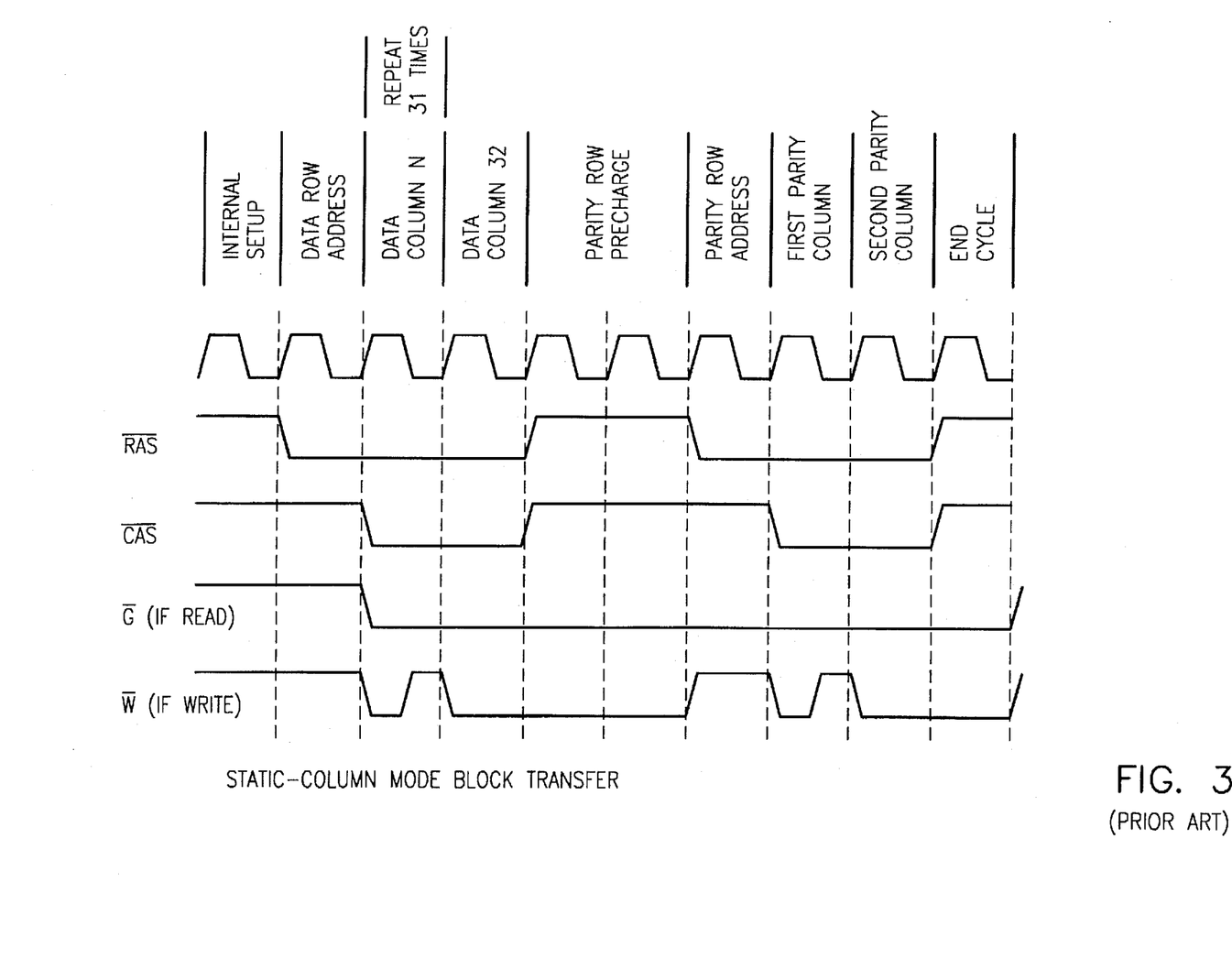
FIG. 3 shows timing cycles associated with the prior art implementation as shown in FIG. 1 for a static column mode DRAM.

FIG. 1 shows the layout of data bits and parity according to the teachings of U.S. Pat. No. 5,280,601. FIG. 2 and FIG. 3 show associated timing cycles involved.

FIG. 1 diagramatically shows storage of data and parity information in a buffer memory 10 consisting of a controller 10a and DRAM 17. The data is received from host 11 along SCSI bus 12 and stored in DRAM 17. Data stored in DRAM 17 is later transferred to a disc memory 13 along disc memory bus 14. Information from the host FIFO 15 is inputted to the DRAM 17 in 16 byte blocks of data. Parity for that block is generated by the parity generator 18 and stored in the parity storage area 19 of the DRAM 17 while 16 byte blocks of data is written in the data storage 20 of the DRAM. During a read cycle, the data is readout both from the parity storage area 19 and the data storage area 20 of the DRAM 17 into the form FIFO 21. Parity checking on the output data being readout from the DRAM 17 is performed by the parity checker 22. Parity is generated during write mode and it is checked during the read mode. Parity is written in a separate place in the DRAM requiring 2K bytes of address space for parity storage area 19 for every 32K bytes of total memory.

The controller 10a further generates appropriate control signals RAS 23 or CAS 24, when the address lines 25 have row address or column address respectively. Further, the controller generates appropriate control signals G or W depending upon read mode or a write mode.

The transfer sequence for a block of 32 bytes of data to a normal page mode DRAM is shown in FIG. 2. After internal setup, the row address is presented. Then 32 columns of data are transferred. Then the parity row address is presented followed by the parity information from the two parity columns. The corresponding data column precharge and parity row and parity column precharge cycles are also shown in FIG. 2.

The transfer sequence for a block of 32 bytes of data to a static column mode DRAM is shown in FIG. 3. If a single static-column mode DRAM is used, the information from a column is transferred one after another, without need for intervening precharge cycles. The FIG. 3 also shows necessary parity row precharge cycle prior to the application of parity row address.

Thus, according to the method disclosed in U.S. Pat. No. 5,280,601, the data and corresponding parity are stored at separate locations in a DRAM, with different row addresses. As it is evident, in order to write or retrieve parity data, parity row precharge cycles in addition to parity row address cycle is needed before parity column address can be applied. In a DRAM read or write cycle, the data blocks are always followed by parity data. The method of storing parity data in a different row adds additional clock cycles before parity data is written or read after the associated data is written or read. Further, according to the teachings of the prior art, an address generation circuit to calculate corresponding row address for parity data will be dependent upon the row/column organization of the DRAM configuration used and the number of bytes of data stored in a column. This constraint on address generation circuit practically leading to a limitation of using a predetermined types of DRAM configurations.

There is a need to use a method wherein the cycle time needed to complete a DRAM read cycle or a DRAM write cycle is optimal. Further, there is a need to avoid or minimize address precharge time associated with reading or writing of data blocks and associated parity data. There is also a need to come up with an easier method of determining the location of the parity data, which can be used with various configurations of DRAM's. There is also a need to minimize the time between the application or availability of data blocks and associated parity data during a write or a read cycle while simplifying the determination of the row address and column address of user information data and corresponding error information data.

SUMMARY OF THE INVENTION

The present invention provides a controller for DRAM buffer memories for a magnetic disc storage system, where the controller provides for efficient use of low cost standard DRAM memories to store user information data and error information data, with improved cycle time for completion of a read cycle or a write cycle.

In accordance with this and other objects of the invention, a method of storing and retrieving P user information data and Q error information data for said P user information data in a buffer memory unit having multiple DRAMs is disclosed. P user information data and Q error information data together define a paragraph. Each user information data has a plurality of information units. Each error information data has a plurality of information units. Each DRAM has a plurality of rows and columns, with a maximum column address of M and each row capable of storing N such paragraphs. The virtual memory address for each user information data is translated to corresponding addresses of memory locations by selecting a row address, selecting a base column address and successively incrementing the base column address to provide additional column addresses for successive user information data. The virtual memory address is further translated to corresponding addresses of memory locations for error information data by retaining the row address determined by the translating step for corresponding user information data, selecting a starting base column address for the error information data and successively decrementing the starting base column address to provide additional column addresses for successive error information data.

The method of selecting a row address for the user information data includes the steps of dividing the virtual memory address by N the number of paragraphs per row, then assigning quotient of the division as the row address and assigning remainder of the division as the starting base column address for the user information data. To store or retrieve successive user information data within a paragraph, the base column address is incremented from (starting base column address+0) to (starting base column address+P).

The method of selecting a column address for the error information data when the number of error information data per paragraph is one, includes the steps of subtracting starting base column address of corresponding user information data from M the maximum column address and assigning result as the column address for error information data.

DETAILED DESCRIPTION

DETAILED DESCRIPTION OF THE PREFERRED EMBODIMENTS

Figure 4:
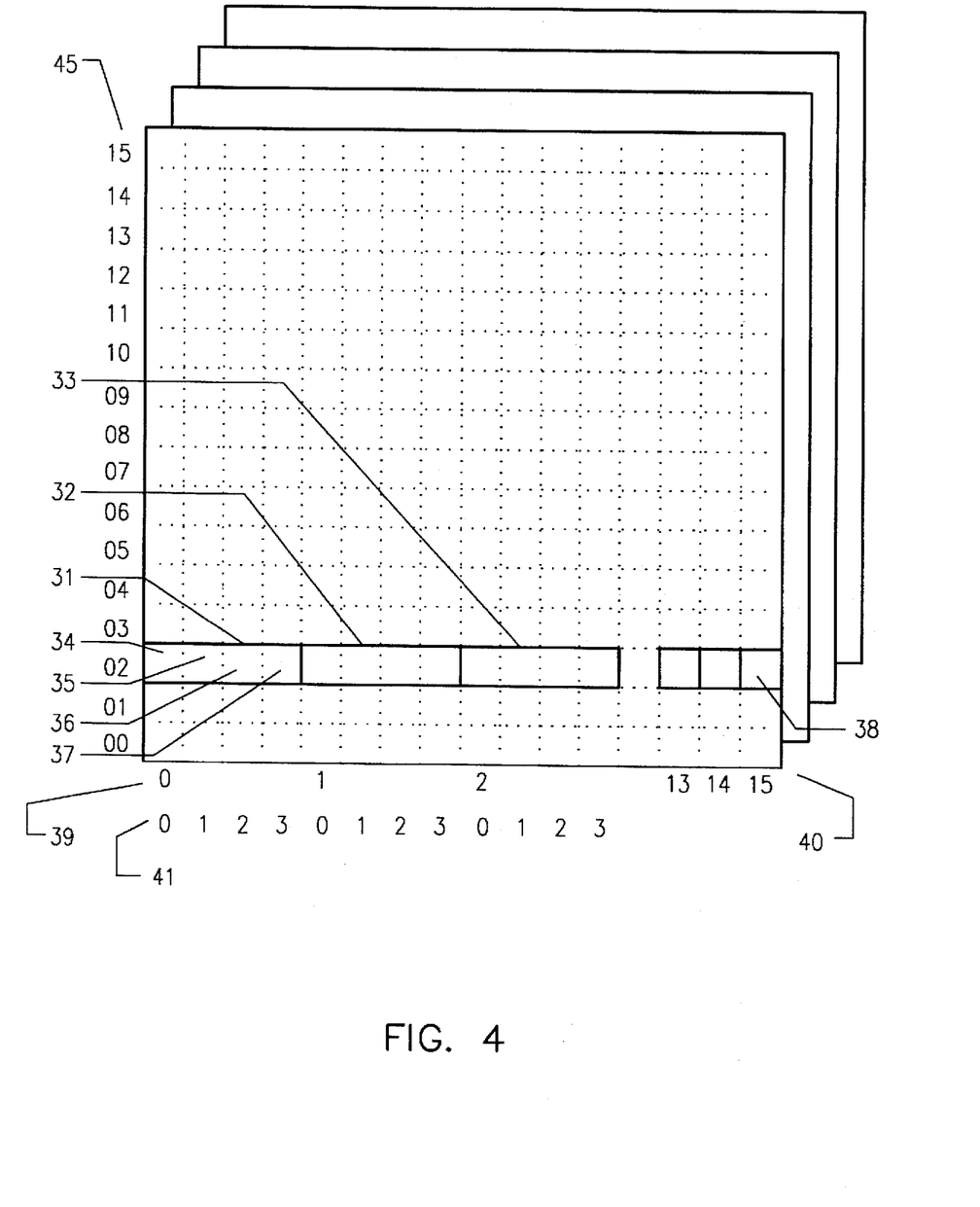
FIG. 4 shows the layout of user information data and en or information data according to the teachings of the current implementation.

Referring now to the drawings, and more particularly to FIG. 4, there is shown a buffer memory unit with 16×16 bytes, with each byte having 4 bits of information units. The buffer memory unit has 16 row addresses and 16 column addresses, to address one out of 256 bytes of memory. Sixteen row address 45 are shown in the figure. Each row of buffer memory store 3 paragraphs 31, 32 and 33 of information, each paragraph 31, 32 and 33 containing four bytes 34, 35, 36 and 37 of user information data and one byte of error information data 38. The starting base column address for user information data portion 39 of paragraphs 31, 32 and 33 is 0, 1 and 2 respectively. The corresponding starting base column address for error information data 40 for respective paragraphs being 15, 14 and 13. Individual user information data bytes 34, 35, 36 or 37 within a paragraph 31, 32 or 33 is addressed by adding corresponding user information byte address 41 to the starting base column address for user information data 39.

The maximum column address of the buffer memory unit as shown is 15. For paragraphs 31, 32 and 33, the corresponding column address for error information data 40 is 15, 14 and 13 respectively.

Figure 5:
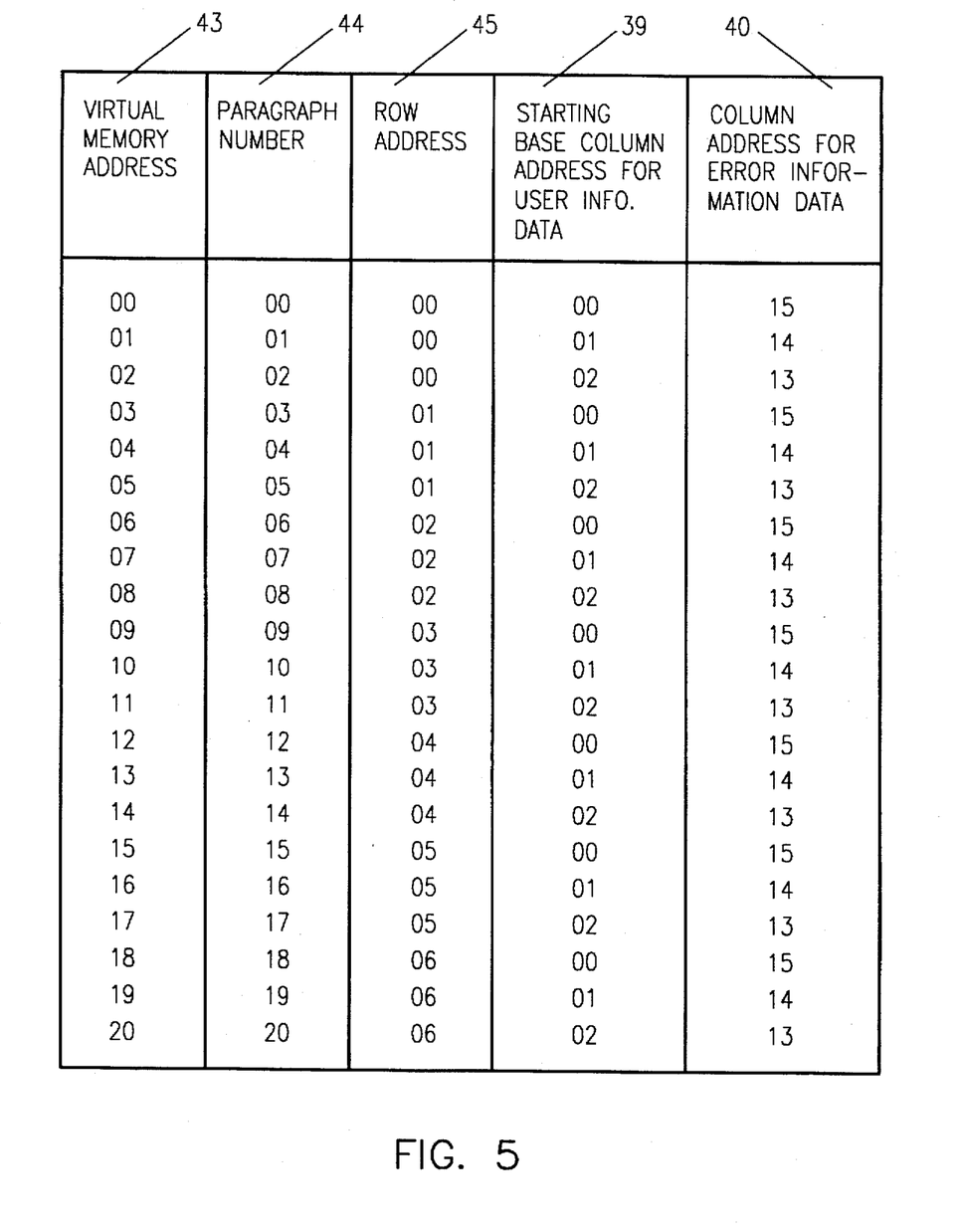
FIG. 5 shows virtual memory address with corresponding addresses for user information data and error information data for the layout shown in FIG. 4.

Referring now to the drawings and more particularly to FIG. 5, there is shown virtual memory address 43 and corresponding paragraph number 44, row address 45, starting base column address for user information data 39 and column address for error information data 40 for the first 20 of possible 48 paragraphs for a buffer memory unit with 16×16 bytes, as described previously in FIG. 4.

Referring now to both FIG. 4 and FIG. 5, for example, to access 6th paragraph, a virtual memory address 43 with a value of 6 is received and divided by 3, the number of paragraphs per row. The quotient 2 is assigned to the row address 45 and remainder 0 is assigned to the starting base column address for user information data 39 for paragraph 6. The column address for the error information data 40 for paragraph 6 is determined by subtracting 0, the starting base column address for user information data 39 for paragraph 6, from 15, the maximum column address of the buffer memory unit, yielding 15 as the column address for the error information data 40 for paragraph 6. Successive user information data bytes within paragraph 6 is addressed by adding the corresponding user information byte addresses 41 to starting base column address for user information data 39 of 0. In the example shown, each paragraph contains only one byte of error information data.

Figures 6, 6A:
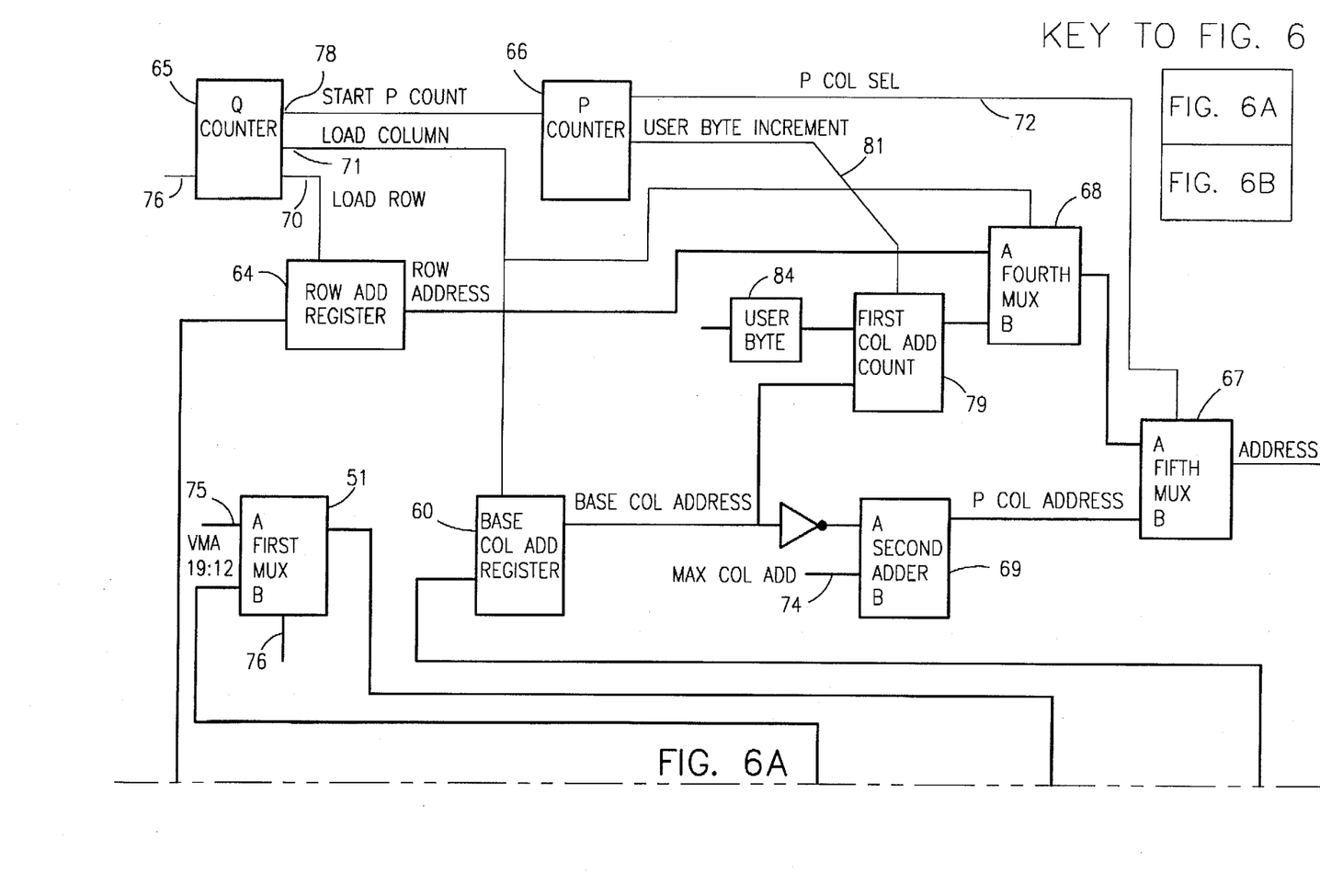
FIG. 6 shows a block diagram for logical implementation of the preferred embodiment.
Figure 6B:
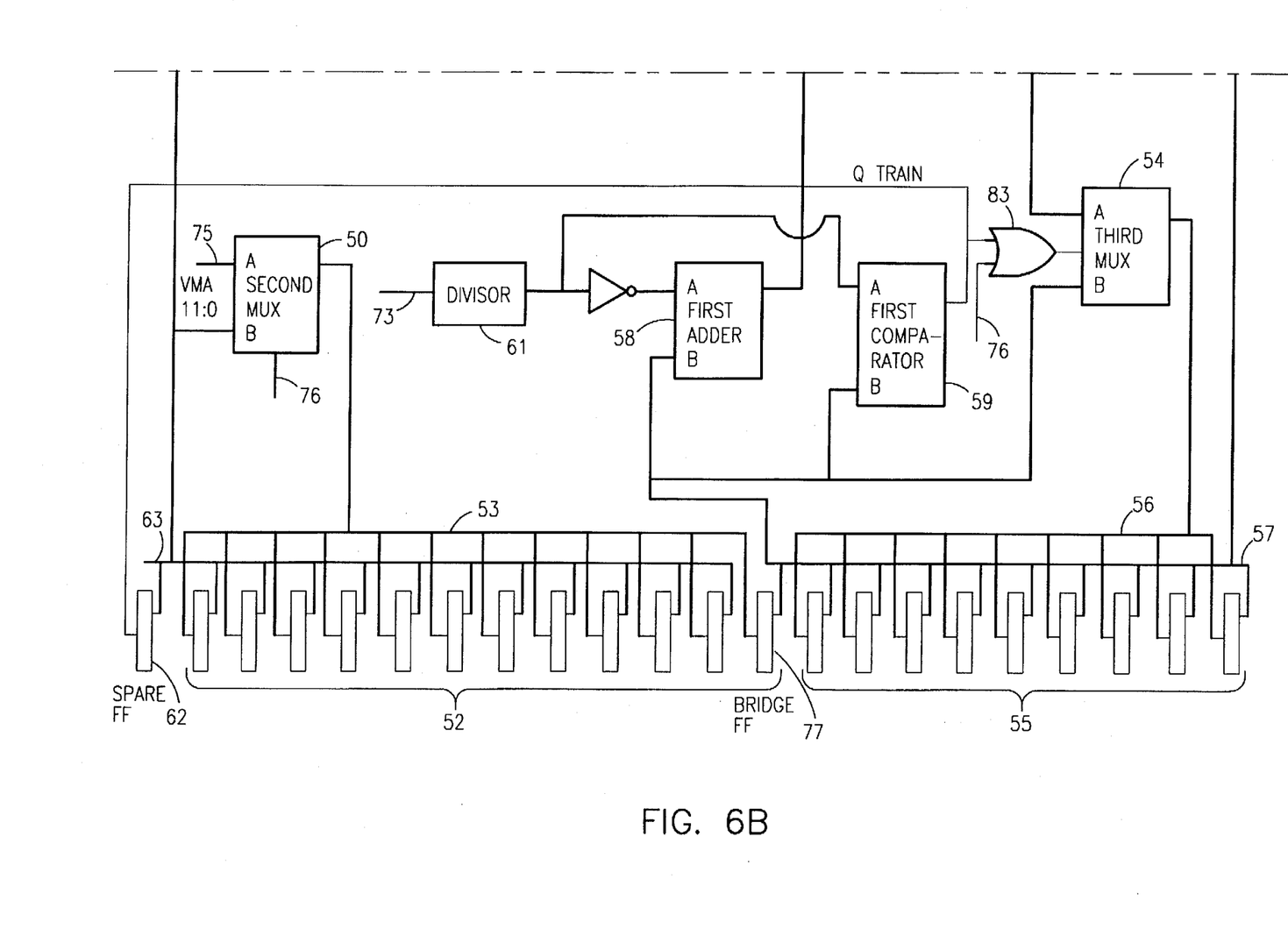

Referring now to drawings and particularly to FIG. 6 there is shown a block diagram for logical implementation of the preferred embodiment. The virtual memory address is presented as A inputs to first Mux 50 and second Mux 51, with Mux 50 receiving bits 0-11 and second Mux 51 receiving bits 12-19. The output of first Mux 50 is connected to the input of first flip-flop bank 52 via first input bus 53. The output of second Mux 51 is connected to the A input of third Mux 54. The output of third Mux 54 is connected to the input of second flip-flop bank 55 via second input bus 56.

The output of second flip-flop bank 55 and the output of Bridge flip-flop 77 are connected to second output bus 57, which routes the outputs to B input of first adder 58, B input of first comparator 59, B input of third Mux 54 and input of column address register 60. The paragraph per row 73 is loaded to a devisor register 61. and output of the divisor register 61 is provided as the A input of first adder 58 and first comparator 59. The output of first adder 58 is provided as the B input of second Mux 51. The A greater than B and A equal to B outputs of first comparator 59 as quotient train is fed as the input to spare flip-flop 62 and as one of the select inputs to third Mux 54, through an OR gate 83.

The output of spare flip-flop 62 and the first flip-flop bank 52 except Bridge flip-flop 77 is connected to first output bus 63, which routes the outputs to B input of first Mux 50 and input of row address register 64. The Q counter 65 counts the completion of division cycle and P counter 66 counts the number of column addresses presented at the output of fifth Mux 67.

The output of row address register 64 is fed as A input of fourth Mux 68 and the output of base column address register 60 is fed as most significant bits of first column address counter 79, with user byte count register 84 loading starting byte address as the least significant bits. The output of the first column address counter 79 is fed as B input of fourth Mux D 68. Inverted output of base column address register 60 is fed as A input of second adder 69. Maximum column address 74 is fed as B input of second adder 69. The output of fourth Mux 68 is fed as A input of fifth Mux 67. The output of second adder 69 is fed as most significant bits of second column address counter 69, with error byte count register 85 loading starting byte address as the least significant bits. The output of second column address counter 80 is fed as B input of fifth Mux 67. The output of fifth Mux 67 present the decoded row, column and parity column address.

The load row 70 output of Q counter 65 enables the loading of row address register 64, when the row address is available on first output bus 63. The load column output 71 of Q counter 65 enables the loading of column address register 60, when the column address is available on second output bus 57. The load column 71 output also enables the counting of P counter 66 to start counting the number of column addresses presented at the output of fifth Mux 67 and selection of A/B input of fourth Mux 68. The output PCOL Sel 72 of P counter 66 enables the selection of A/B output of fifth Mux 67. The user byte increment 81 signal of P counter 66 increments the first column address counter 79.

The virtual memory address 75, paragraphs per row 73 as divisor and maximum column address 74 are presented as input to first Mux 50 and second Mux 51, first adder 58 and second adder 69. The number of user information data bytes per paragraph are loaded into user byte count register 84. Then load signal 76 is applied. This enables the selection of A input of first Mux 50, second Mux 51, and third Mux 54. This also enables the Q counter 65. Respective address bits are then presented as inputs to the first flip-flop bank 52 and second flip-flop bank 55

At the next clock cycle, the outputs of second flip-flop bank 55, which is the most significant 10 bits of the virtual memory address 75 is presented as dividend at the B input of the first adder 58, B input of comparator 59 and B input of third Mux 54. The output of the first adder 58 through the B input of second Mux 51 is available as the A input of third Mux 54. If the dividend was greater than or equal to the divisor, a quotient of 1 is received on the output of first comparator 59. If the dividend was less than the divisor, a quotient of 0 is received. The quotient of 1 further enables the selection of A input of third Mux 54. Thus, if quotient was 1, then the remainder of the division is available as the output of first adder 58, which will be presented as the A input of third Mux 54, thereby loading the remainder of the division into second flip-flop bank 55. Further, the quotient is stored in the Spare flip-flop 62. During the next clock cycle, the contents of all the flip-flops in first flip-flop bank 52 and second flip-flop bank 55 are shifted to the right and another division cycle occurs. Upon completion of 12 such division cycles, the quotient of the division is available in first flip flop bank 52 and the Spare flip-flop 62, except the bridge flip-flop 76. The Spare flip-flop 62 containing the least significant bit of the quotient. Further, the remainder is available in Bridge flip-flop 77 and second flip-flop bank 55, with Bridge flip-flop 77 containing the least significant bit of the quotient.

Upon completion of 12 division cycles, the quotient, which is the row address is available as the input to row address register 64. At this point, Q counter 65 issues a load row 70 signal, enabling the latching of row address and initiates the P counter 66 by issuing a start P count 78 signal.

The row address is enabled at the output of fifth Mux 67, via the A input of fourth Mux 68. At the next clock cycle, the Q counter issues a load column 71 signal, which latches in the base column address available at the input of base column address register 60. The output of base column address register 60 is fed as the most significant bits of first column address counter 79.

The base column address and maximum column address 74 are presented as inputs to second adder 69 and the difference as column address for error information data is available at the output of second adder 69.

The output of first column address counter 79 is available as the B input of fourth Mux 68. The load column 71 signal of Q counter 65 enables the selection of B input of fourth Mux 68. The user byte increment 81 signal from P counter 66 to the first column address counter 79 successively increments the column address to provide successive user information data column addresses as the A input of fifth Mux 67 and available at the output of fifth Mux 67.

After incrementing successive user information data column address, the P counter 66 issues a PCOL Sel 72 signal which will enable the selection of B input of fifth Mux 67, thus presenting the column address for error information data at the output of fifth Mux 67.

In the above description, the error information data could be parity information or could be any other type of error detection or error correction data. Further, depending upon the type of error information data, one or more number of bytes of error information data may be necessary for a given number of bytes of user information data. By storing the error information data in the same row as the user information data, the disclosed method can be easily implemented in DRAM configurations of any rows and columns, provided the width of the DRAM is at least 2(P+Q), with a simple means for translating a given virtual memory address to corresponding address for user information data and error information data.

From the above description, it is apparent that many modifications and variations of the present invention are possible in light of the above teachings. It is therefore to be understood that, within the scope of the appended claims, the invention may be practiced otherwise than as specifically described hereinabove.

I claim:

1. A method of storing and retrieving a plurality P of user information data, a plurality Q of error information data for said plurality P of user information data, each said user information data having a plurality of information units, each said error information data having a plurality of information units, P user information data and Q error information data together defining a paragraph, for an information storage system with N paragraphs in a buffer memory unit comprising a plurality of DRAM's, each having a maximum column address of M, the method comprising the steps of:

providing a virtual memory address for each said user information data:

translating said virtual memory address to corresponding addresses of memory locations in said buffer memory unit for storage of plurality of user information data, said translating step for user information data including the steps of:

selecting a row address for storage of said user information data by dividing said virtual memory address by N and assigning quotient of said division as the row address;

selecting a base column address for said user information data by
assigning remainder of said division as the starting, base column address and
successively incrementing said starting base column address to provide additional column addresses for successive user information data:
transferring each of said P user information data to an address location in said buffer memory unit determined by said translating step and
translating said virtual memory address to corresponding addresses of memory locations in said buffer memory unit for storage of plurality of error information data, said translating step for error information data including the steps of:
retaining said row address determined by said translating step for user information data;
selecting a starting base column address for said error information data and successively decrementing said starting base column address to provide additional column address for successive error information data and transferring each of said Q error information data to an address location in said buffer memory unit determined by said translating step for error information data.

2. The method of claim 1 wherein the step of selecting a starting base column address for said error information data includes the steps of: subtracting starting base column address from M and assigning result as the column address for error information code when said paragraph contains single error information data.

3. The method of claim 1 wherein the step of incrementing said base column address for said user information data includes the step of incrementing said base column address from (base column address+0) to (base column address+P).

4. A method of storing and retrieving plurality P of user information data, plurality Q of error information data for said plurality P of user information data, each said user information data having plurality of information units, each said error information data having plurality of information units, P user information data and Q error information data together defining a paragraph, for an information storage system with N paragraphs in a buffer memory unit comprising a plurality of DRAM's, each having a maximum column address of M, the method comprising the steps of:

providing a virtual memory address for each said user information data;
translating said virtual memory address to corresponding addresses of memory locations in said buffer memory unit for storage of plurality of user information data, said translating step for user information data including the steps of:
dividing said virtual memory address by N and assigning quotient of said division as the row address;
selecting a base column address for said user information data; and successively incrementing said base column address to provide additional column addresses for successive user information data;
transferring each of said P user information data to an address location in said buffer memory unit determined by said translating step.

5. The method of claim 4 wherein said step of selecting a base column address for said user information data includes the step of assigning remainder of said division as the starting base column address.

6. The method of claim 4 further including the step of translating said virtual memory address to corresponding addresses of memory locations in said buffer memory unit for storage of plurality of error information data, said translating step for error information data including the steps of:
retaining said row address determined by said translating step for user information data;
selecting a starting base column address for said error information data and successively decrementing said starting base column address to provide additional column address for successive error information data;
transferring each of said Q error information data to an address location in said buffer memory unit determined by said translating step for error information data.

7. The method of claim 6 wherein the step of selecting a starting base column address for said error information data includes the steps of:
subtracting starting base column address from M and
assigning result as the column address for error information code when said paragraph contains single error information data.

* * * * *